(12) United States Patent
Johnson, Jr.

(10) Patent No.: US 7,658,335 B2
(45) Date of Patent: Feb. 9, 2010

(54) HYDRONIC HEATING SYSTEM

(75) Inventor: David E. Johnson, Jr., Indianapolis, IN (US)

(73) Assignee: Thermodynamic Process Control, LLC, Indianapolis, IN (US)

( * ) Notice: Subject to any disclaimer, the term of this patent is extended or adjusted under 35 U.S.C. 154(b) by 362 days.

(21) Appl. No.: 11/627,739

(22) Filed: Jan. 26, 2007

(65) Prior Publication Data

US 2008/0179415 A1    Jul. 31, 2008

(51) Int. Cl.
*F24D 19/10* (2006.01)
*F24D 3/02* (2006.01)
*F22D 5/00* (2006.01)

(52) U.S. Cl. .................. 237/8 R; 237/2 A; 237/8 A; 122/448.3

(58) Field of Classification Search .............. 237/2 A, 237/8 R, 81, 8 A; 122/448.3
See application file for complete search history.

(56) References Cited

U.S. PATENT DOCUMENTS

| | | | | |
|---|---|---|---|---|
| 2,780,206 A | * | 2/1957 | La Rocque et al. | 122/448.3 |
| 3,144,991 A | * | 8/1964 | Marchant | 237/8 R |
| 3,421,691 A | * | 1/1969 | Forbes | 236/9 R |
| 3,576,177 A | * | 4/1971 | Block et al. | 122/1 R |
| 4,637,349 A | * | 1/1987 | Robinson | 122/448.3 |
| 4,694,783 A | * | 9/1987 | Cleer, Jr. | 122/448.3 |
| 4,864,972 A | * | 9/1989 | Batey et al. | 122/448.3 |
| 5,042,431 A | * | 8/1991 | Shprecher et al. | 122/448.3 |
| 5,452,687 A | * | 9/1995 | Christiansen | 122/448.3 |
| 5,747,342 A | * | 5/1998 | Zupanovich | 436/55 |
| 6,062,485 A | * | 5/2000 | Stege et al. | 237/2 A |
| 6,299,071 B1 | * | 10/2001 | Fiedrich | 237/8 R |
| 2005/0230490 A1 | * | 10/2005 | Pouchak et al. | 237/81 |

FOREIGN PATENT DOCUMENTS

| | | | | |
|---|---|---|---|---|
| GB | 2206954 A | * | 1/1989 |
| JP | 10103605 A | * | 4/1998 |

OTHER PUBLICATIONS

Heat-Timer Corp., Installation and Operation Instructions for Mini-Mod and Mini-Extension, Sequencing Modulating Control for Hydronic Heating Systems, pp. 1-7.
Heat-Timer Corp., Model MOD-4, Installation & Operation Manual, pp. 1-47.
Heat-Timer Corp., Multi-Mod Installation & Operation Manual, pp. 1-36.
Heat-Timer Corp., Control System Specification, Mini-Mod and Mini-Extension.

* cited by examiner

*Primary Examiner*—Steven B McAllister
*Assistant Examiner*—Patrick F. O'Reilly, III
(74) *Attorney, Agent, or Firm*—Woodard, Emhardt, Moriarty, McNett & Henry LLP

(57) ABSTRACT

A hydronic heating system for a building includes condensing and non-condensing boilers in a hybrid arrangement. A control apparatus receives information from one or more condition sensors, such as air temperature or water flow, and calculates heating load requirements. The control apparatus then independently selects and operates the various boilers of the system to optimize boiler efficiency and operating characteristics.

18 Claims, 7 Drawing Sheets

HYDRONIC HEATING SYSTEM

BACKGROUND

Commercial hydronic heating systems are used in buildings to supply heat via hot water that is circulated by a pump. One type of traditionally common heating system utilizes non-condensing boilers in which a portion of the input heat is lost via the boiler flue. A more modern type of heating system increases overall efficiency by employing condensing boilers. A condensing boiler recovers a large amount of heat from exhaust gases that would otherwise be lost via the flue. Through the use of heat exchangers, the temperature of the gases exiting the flue may be reduced from a range of 300° F.-450° F. to a range of 90° F.-130° F.

Although it is becoming more of a standard practice to employ hydronic heating systems that utilize high-efficiency condensing boilers, many existing heating systems employ one or more non-condensing boilers of an age or condition that does not justify replacement of those boilers from an economic standpoint, as associated radiators, heat exchangers, or other end user heat transfer or transmission devices would require replacement as well. The result is that many buildings may have both non-condensing as well as condensing boilers, thereby forming what is known as hybrid heating systems. Although the overall efficiency of a condensing boiler system is higher than a non-condensing system, each type of boiler has certain advantages over the other depending upon factors such as outside air temperature and the heat load on the boiler. The present disclosure is directed to an arrangement for controlling a hybrid heating system in which each type of boiler can be realized to its particular advantage.

SUMMARY

It is therefore an object of the present disclosure to provide a hybrid hydronic heating system in which the operation of condensing and non-condensing boilers is controlled to optimize the efficiency and life of each boiler based on heating load requirements.

It is a further object of this disclosure to control the operation of each boiler independently based on a variety of factors, including the type, size, cycle time, efficiency, and use history of the boiler.

Further objects, embodiments, forms, benefits, aspects, features and advantages of the present disclosure may be obtained from the description, drawings, and claims provided herein.

DETAILED DESCRIPTION

Figure 1:
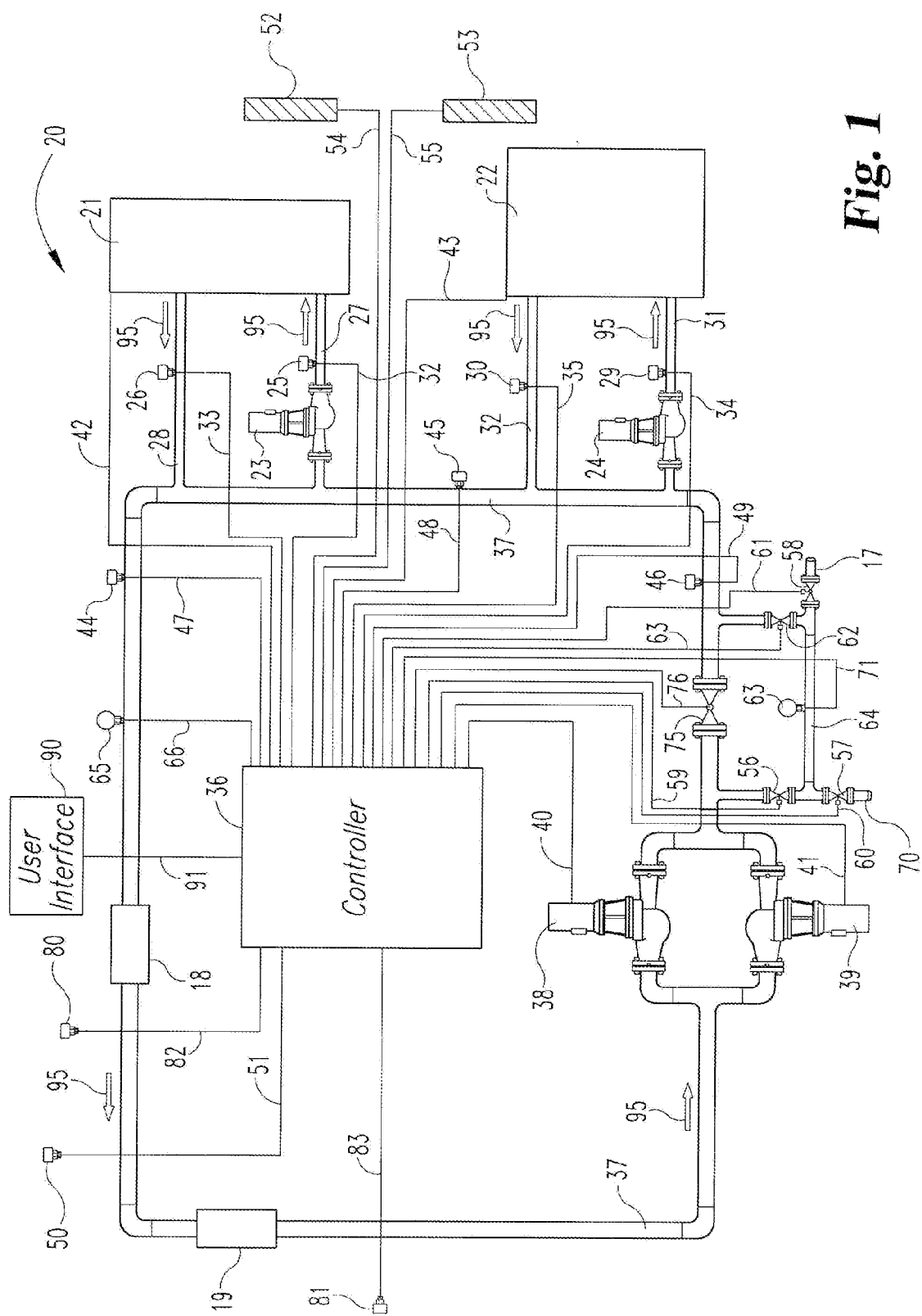
FIG. 1 is a schematic and block diagram of an embodiment of the present disclosure, illustrating a hybrid heating system having two boilers.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated examples, and further applications of the principles of the disclosure as illustrated therein are herein contemplated as would normally occur to one skilled in the art to which the disclosure relates.

Referring to FIG. 1, there is shown a hydronic (i.e., hot water) heating system 20 that includes boilers 21 and 22 for heating water that is circulated in order to heat a building. Boilers 21 and 22 may both be condensing or non-condensing boilers, or one boiler may be a condensing boiler while the other is a non-condensing boiler. Boilers 21 and 22 are respectively associated with pumps 23 and 24 that act to provide circulation of the heated water throughout the building. Controller 36 is operably connected to boilers 21 and 22 via connectors 42 and 43 respectively. Connectors 42 and 43 are illustratively shown as being a cable or wire, but connectors 42 and 43, as well as other electrical-type connectors described and shown herein, may take the form of an apparatus or functionality consistent with any technology known to those skilled in the art and appropriate for the purpose and application described, e.g., wireless transmission technology. Controller 36 provides signals that control the operation of boilers 21 and 22, including the operation of their respective boiler pumps 23 and 24. A temperature sensor 25 is located to measure the water temperature in boiler inlet or return water line 27 of boiler 21. Temperature sensor 25 is operably connected to controller 36 via connector cable 32. Temperature sensor 26 is located to measure the water temperature in outlet or system supply water line 28 of boiler 21 and is operably connected to controller 36 via cable. 33 Similarly, a temperature sensor 29 is located to measure the water temperature in inlet or return water line 31 of boiler 22. Temperature sensor 29 is operably connected to controller 36 via connector, e.g., cable or wire, 34. Temperature sensor 30 is located to measure the water temperature in outlet or system supply water line 32 of boiler 22 and is operably connected to controller 36 via cable 35. Suitable temperature sensors and controllers are commercially available.

Water lines 27, 28, 31 and 32 are connected to the main circulating water line 37 that circulates heated water through heat transmission devices 18 and 19, e.g., heat exchangers, radiators, or air handlers, located at various points throughout the building to heat the building. Auxiliary pumps 38 and 39 are connected to main water line 37 to assist the water flow. Pumps 38 and 39 are connected, e.g., via electrical connectors such as wires or cables 40 and 41, respectively, to controller 36 to provide control of pumps 38 and 39. Water flow direction in heating system 20 is indicated by arrows 95 in FIG. 1.

Additional temperature sensors 44, 45, and 46 are located along main water line 37 to measure the temperature of the water at that location, and return the temperature data via lines 47, 48, and 49, respectively, to controller 36, although it is understood that temperature data may be returned in a non-wired manner, e.g., wireless transmission, as would be known to those skilled in the art. Sensor 44 is illustratively shown as being located in the vicinity of the outgoing heated water from boilers 21 and 22, respectively. Sensor 45 is illustratively shown as being located in between boilers 21 and 22 to measure water temperature in the return portion of main water line 37. Sensor 46 is illustratively shown as being located in the return water flow from heat transmission devices 18 and 19 to boilers 21 and 22. An outside air temperature sensor 50 is connected to controller 36 via data line 51 to provide measurements of outside air temperature to controller 36 of heating system 20.

Air temperature sensors 80 and 81 are illustratively shown as being connected to controller 36 via connectors 82 and 83, respectively. Air temperature sensors 80 and 81 are illustratively located in rooms or areas of the building to be heated, and provide data to controller 36 regarding the ambient temperature of those rooms or areas.

Dampers 52 and 53 are illustratively shown as being controlled via connectors 54 and 55, respectively, by controller 36 for controlling outside air flow to boilers 21 and 22, respectively, in order to provide free air make-up to boilers 21 and 22. Flow valves 56, 57, 58, and 62 are illustratively shown as being connected to and controlled by controller 36 via connectors 59, 60, 61, and 63, respectively. The rate and quantity of soft or conditioned water supplied to flush by-pass or sidestream water line 64 via incoming water line 70, in order to maintain calibration of pH meter 63 located in sidestream water line 64, is controlled by way of flow valves 57 and 58. Water is drained from main water line 37 via drain line 17 by way of flow valves 56 and 58. pH meter 63 measures the pH of the water within main water line 37. Main valve 75 is located within main water line 37 and is illustratively shown as being connected to controller 36 by connector 76 to force water flow through sidestream water line 64. Connector 71 connects pH meter 63 to controller 36. Flow measuring device 65 is mounted to main water line 37 and provides flow data via connector 66 to controller 36. A user interface 90, e.g., computer input screen, is illustratively shown as being connected to controller 36 by way of connector 91.

It will be understood that the system of FIG. 1 is illustrative in nature and is not limited to any specific number of boilers, any particular piping arrangement of the various water lines, valves, sensors or controls shown in the drawings, which will in operation depend upon particular building requirements.

Figure 2:
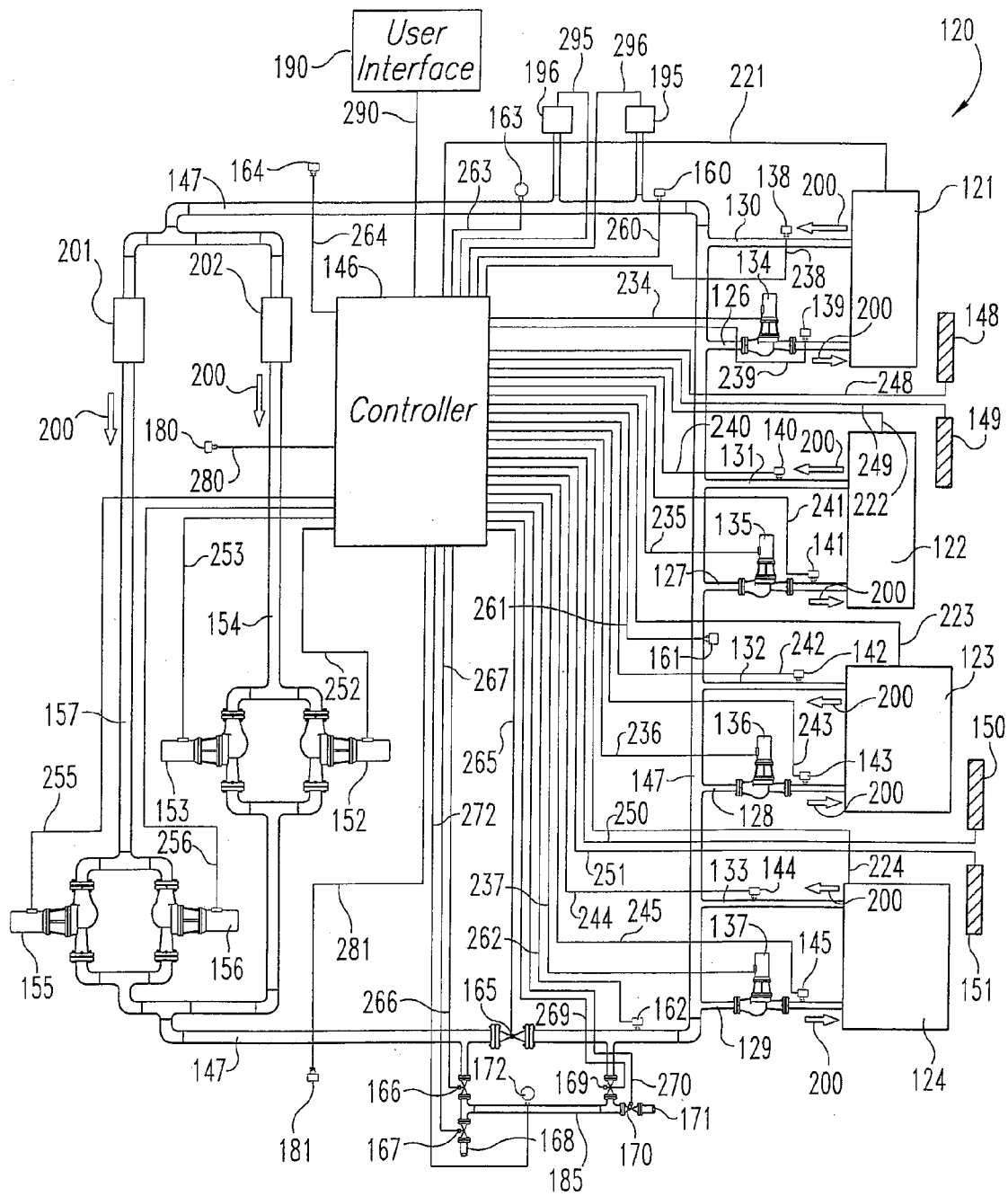
FIG. 2 is a schematic and block diagram of an embodiment of the present disclosure, illustrating a hybrid heating system having four boilers.

To further illustrate the non-limiting nature of the present disclosure, reference is now made to FIG. 2 which illustrates a heating system 120. Heating system 120 illustratively includes non-condensing boilers 121 and 122 and condensing boilers 123 and 124 connected to a main water circulation line 147 by inlet or boiler return water lines 126, 127, 128, and 129, respectively and outlet or system supply water lines 130, 131, 132, and 133, respectively. Boilers 121, 122, 123, and 124 are respectively associated with pumps 134, 135, 136, and 137 which are mounted on the boiler return water lines 126, 127, 128, and 129, respectively. Pumps 134, 135, 136, and 137 are preferably enabled with variable frequency drive circuitry that allows the pumps to be operated at variable speeds, i.e., pumping rates. Similar to heating system 20 of FIG. 1, heating system 120 of FIG. 2 includes temperature sensors 138, 140, 142, and 144 mounted on the outlet or system supply water lines 130, 131, 132, and 133, respectively, and temperature sensors 139, 141, 143, and 145 mounted on the inlet or return water lines 126, 127, 128, and 129, respectively. Boilers 121, 122, 123, and 124 are operably connected to controller 146 via connectors 221, 222, 223, and 224, respectively. Pumps 134, 135, 136, and 137 are operably connected to controller 146 via connectors 234, 235, 236, and 237, respectively. Temperature sensors 138, 139, 140, 141, 142, 143, 144, and 145 are operably connected to a controller 146 via connectors 238, 239, 240, 241, 242, 243, 244, and 245, respectively. While FIG. 2 shows controller 146 connected to the various components herein described via hard wired control or connection lines or wires, it will be understood that various wireless connections are envisioned including, but not limited to, IR, RF, and optical links. In addition, control and sensor data may be communicated via various network interfaces and protocols including parallel or serial data buses, Ethernet, Bluetooth, IEEE standard control interfaces, or other computer or data networks that are known to those of ordinary skill in the art both now and as may be developed in the future.

Boilers 121, 122, 123, and 124 include air dampers 148, 149, 150, and 151, which are also operably connected to controller 146 via connectors 248, 249, 250, and 251, respectively. Controller 146 may independently control the operation of air dampers 148, 149, 150, and 151 via switching or control signals, e.g., digital signals, sent to dampers 148, 149, 150, and 151 via connectors 248, 249, 250, and 251 to control the outside or free air make-up to boilers 121, 122, 123, and 124, respectively. Auxiliary pumps 152 and 153 pump or circulate water through secondary water line 154 of main water line 147 and are operated by controller 146 via connectors 252 and 253, respectively. Auxiliary pumps 155 and 156 pump or circulate water through secondary water line 157 and are operated by controller 146 via connectors 255 and 256, respectively. Water flow direction through system 120 is illustratively shown by arrows 200.

Valves 167 and 170 are connected to and controlled by controller 146 via connectors 267 and 270, respectively, to provide soft or conditioned water via inlet line 168 and drain line 171, respectively, to flush sidestream 185 as necessary to maintain the calibration of pH meter 172. Controller 146 is also operably connected to sidestream valves 166 and 169 via connectors 266 and 269, respectively, to control the flow of water from main water line 147 to a pH measurement sidestream water line 185. A pH meter 172 is provided to measure the pH of the water circulating throughout system 120. pH meter 172 is shown as being mounted in pH measurement sidestream 185 and operably connected to controller 146 via connector 272. Main valve 165 is mounted within main water line 147 and is also operably connected to controller 146 via connector 265. Controller 146 operates main valve 165 to force the flow of water through pH measurement sidestream 185. A weak acid pump 195 and a weak base pump 196 are illustratively shown as being coupled into main water line 147. Acid pump 195 and base pump 196 are shown as being operably connected to controller 146 via connectors 295 and 296, respectively. Controlling the pH of the water circulating through main water line 147 is important to prevent premature failure or wear with respect to the components of heating system 120 due to overly acidic or basic water. Through the operation of valves 165, 166, 167, 169, and 170 by controller 146 by signals via connectors 265, 266, 267, 269, and 270, respectively, periodic checks of the pH of the water in main water line 147 can be made by diverting some water into sidestream 185 and measuring its pH by pH measurement sensor 172 and returning that data to controller 146 via connector 272. If the water requires an adjustment of its pH, controller 146 can initiate the operation of weak acid pump 195 or weak base pump 196 by signals sent via connectors 295 or 296, respectively, as needed to restore the pH of the water in main water line 147 to a satisfactory level.

Temperature sensors 160, 161, and 162 are mounted to main water line 147 to measure the temperature of the circulating water at various locations along main water line 147. Sensors 160, 161, and 162 are shown as being operably connected to controller 146 via connectors 260, 261, and 262, respectively. A flow measuring device 163 is shown as being mounted on main water line 147 to provide water flow information to controller 146 via connector 263. An outdoor air temperature sensor 164 is mounted outside the building and is operably connected to controller 146 via connector 264. Air temperature sensors 180 and 181 are located in rooms or areas of the building and are also operably connected to controller 146 via connectors 280 and 281, respectively, to provide information with respect to the ambient temperature of the rooms or areas in which the sensors are located. FIG. 2 illustratively shows heat transmission devices 201 and 202 located within system 120. Devices 120 may be end user heat distribution apparatus, such as radiators, heat exchangers, or air handlers, for only a few examples. A user interface device 190 is also operably connected to controller 146 via connector 290 to allow a user of heating system 120 to select or change various input criteria, e.g., desired room temperature, or the manner in which heating system 120 is operated. User interface device 190 also provides a means for information regarding the status or condition of the components of system 120 to be communicated to the user.

The piping configuration of main water line 37 shown in FIG. 1 and main water line 147 shown in FIG. 2 locates the condensing boilers 123 and 124 upstream from the non-condensing boilers 121 and 122 such that during the time the condensing boilers are enabled, their operation will pre-heat the water flowing to the non-condensing boilers, thereby increasing the efficiency of the non-condensing boilers and acting to prevent the non-condensing boilers from condensing, thereby protecting the non-condensing boilers from the detrimental effects of condensation.

As previously described, the present disclosure does not limit the number or types of boilers that can be used within a heating system. For purposes of explaining the operation of a heating system constructed in accordance with the present disclosure, reference will be made to FIGS. 3-7 which, for example only, illustrate elements of a hydronic heating system that includes two condensing and two non-condensing boilers in an arrangement such as that shown in FIG. 2. Reference will therefore be made primarily to FIG. 2, although it is understood that the principles of operation to be described apply equally to heating systems having different numbers of boilers, including but not limited to the system of FIG. 1.

Figure 3:
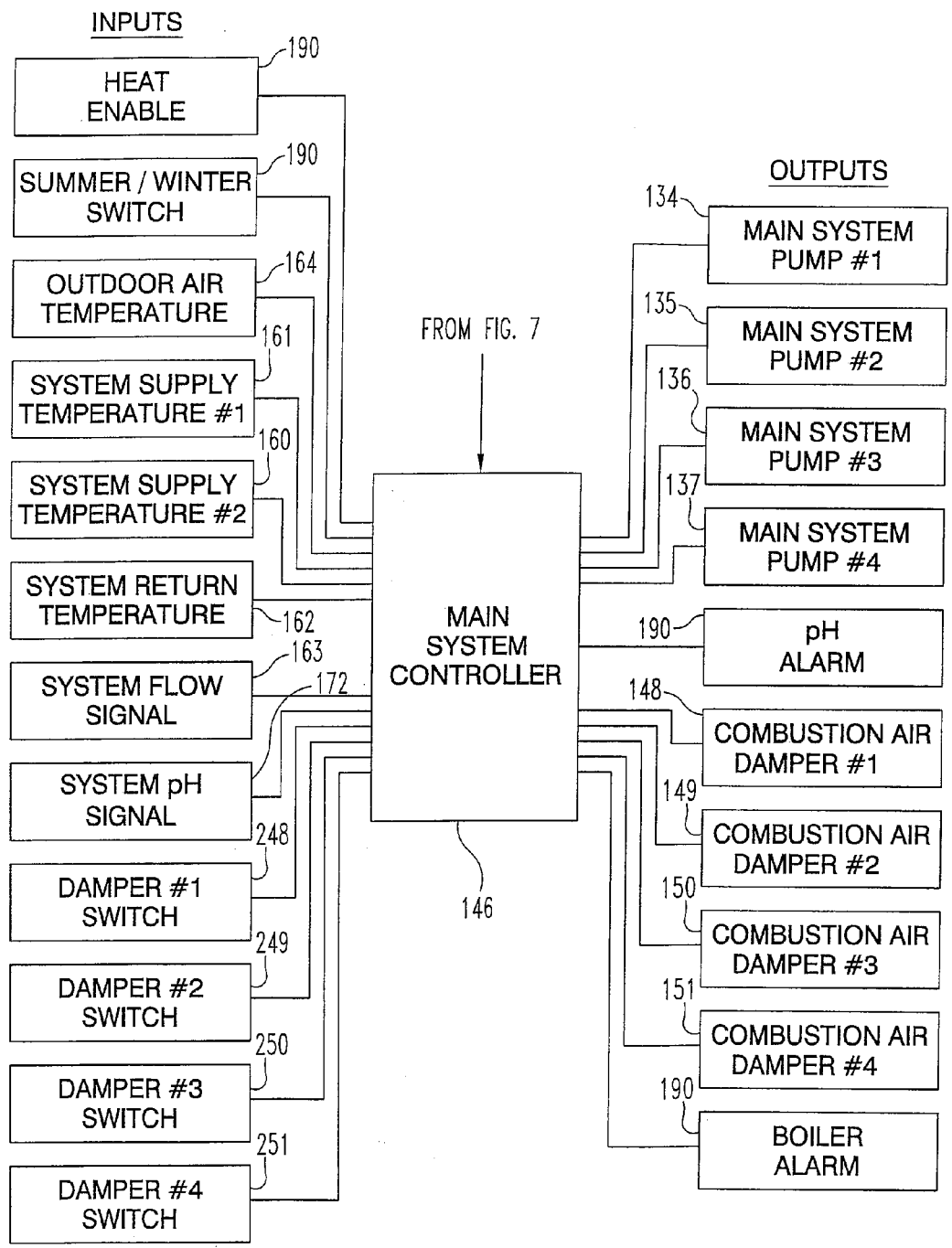
FIG. 3 is a schematic and block diagram of the main control circuit used in a heating system constructed in accordance with an embodiment of this disclosure.
Figure 4:
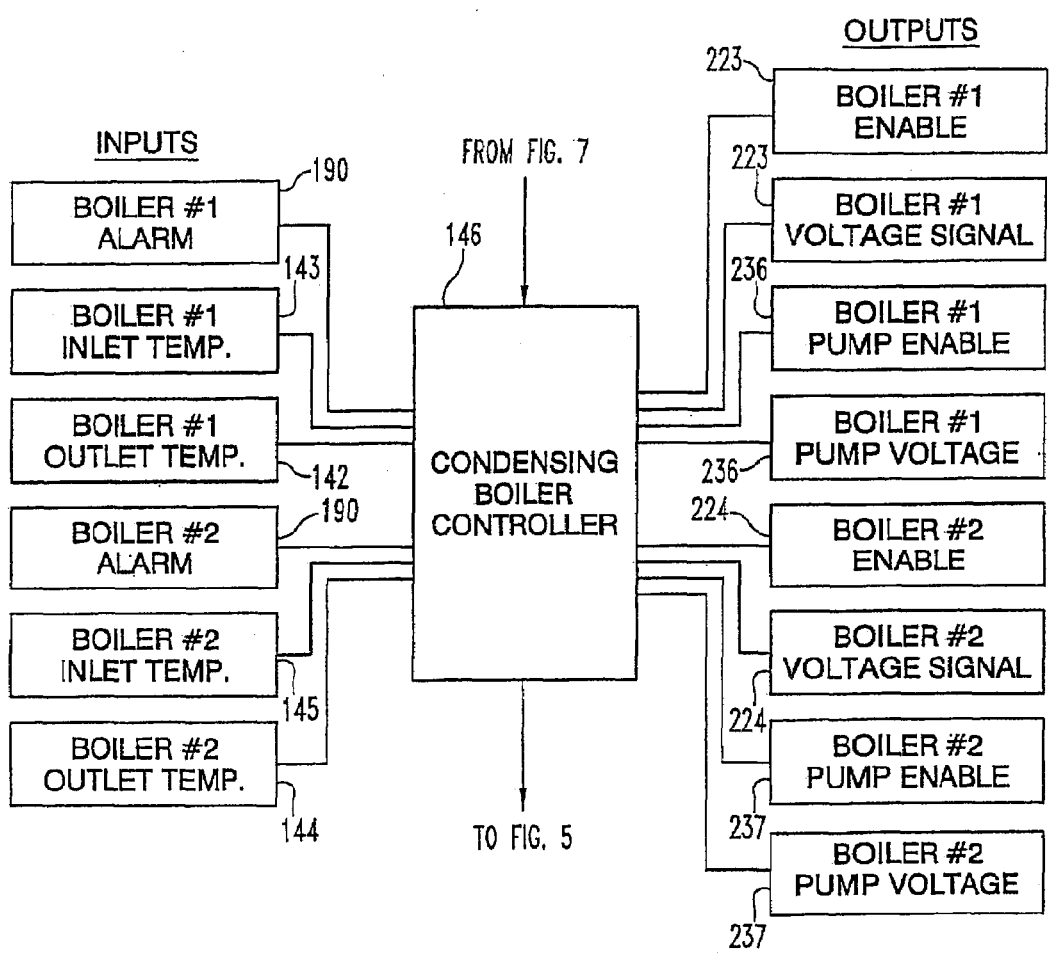
FIG. 4 is a schematic and block diagram of condensing boiler control circuitry used in a heating system constructed in accordance with an embodiment of this disclosure.
Figure 5:
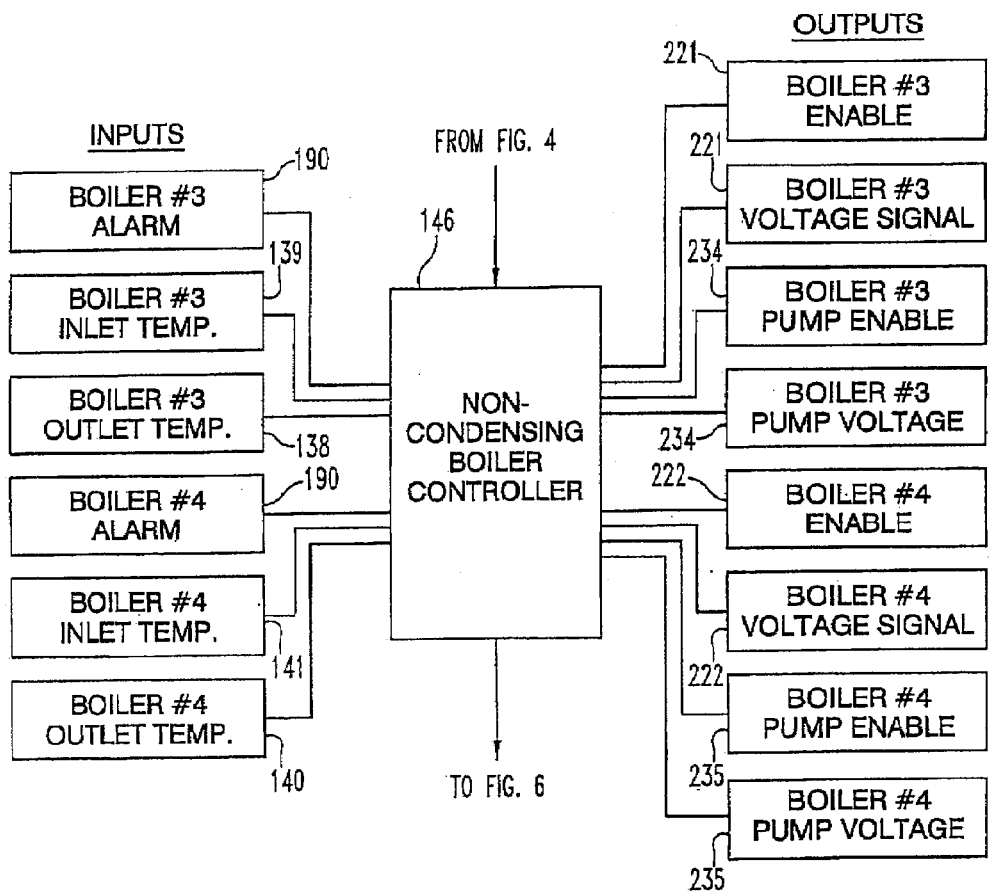
FIG. 5 is a schematic and block diagram of non-condensing boiler control circuitry used in a heating system constructed in accordance with an embodiment of this disclosure.
Figure 6:
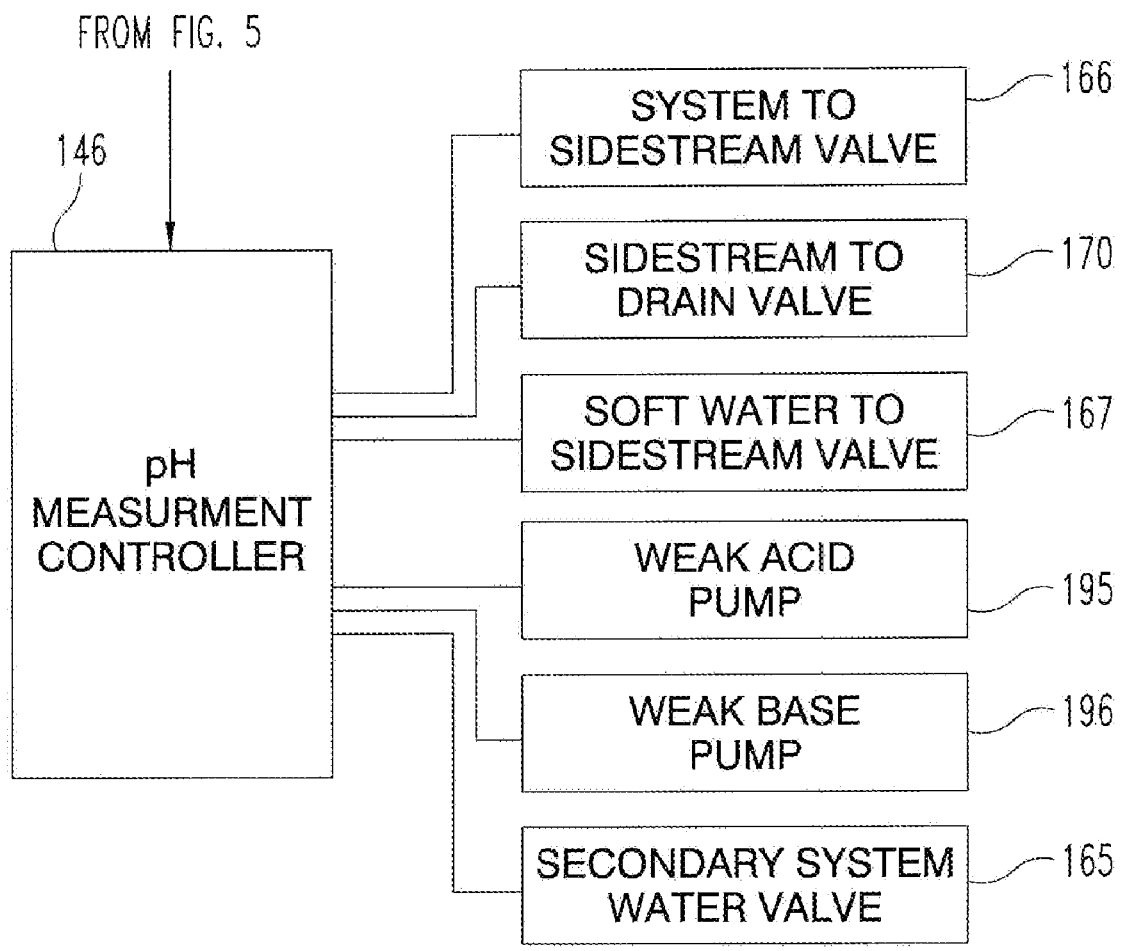
FIG. 6 is a schematic and block diagram of a pH measurement control circuit used in a heating system constructed in accordance with an embodiment of this disclosure.
Figure 7:
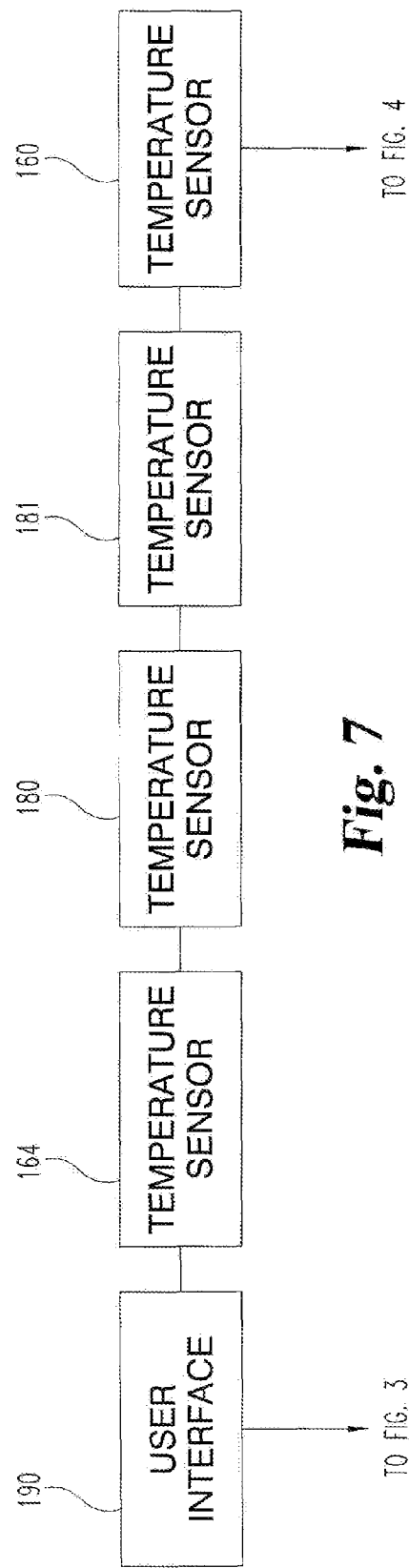
FIG. 7 is a schematic and block diagram illustrating a number of temperature sensor circuits, as well as a user interface circuit used in a heating system constructed in accordance with an embodiment of this disclosure.

FIG. 3 illustrates the presence of a main system controller and its associated input and output signals and functions. FIG. 4 illustrates the presence of a condensing boiler controller and its associated input and output signals and functions. FIG. 5 illustrates a non-condensing boiler controller with its associated input and output signals and functions, and FIG. 6 illustrates a pH measurement controller and its associated input and output signal and functions. It is understood that while separate or individual controllers can of course be used, a unitary controller, such as controller 36 or 146, may comprise the functionality of each of the controller elements shown in FIGS. 3-6 in the physical embodiment of a single device. Therefore, for purposes of simplifying the following explanation, each of the controller devices in FIGS. 3-6 will be identified by reference number 146. Additionally, while FIGS. 3-7 may illustrate elements that contain language that suggests a function or type of information, that element may be identified by a reference number that corresponds to the physical device shown in FIG. 2 that performs such function or provides such information. FIG. 7 illustrates a representation of the functionality within heating system 120 of user interface 190 as well as a number of representative temperature sensors, e.g., sensors 160, 164, 180, and 181.

Through the use of user interface device 190, the type of each boiler 121-124 (e.g., condensing or non-condensing) will be inputted by the user. Minimum and maximum return and supply temperatures for each of boilers 121-124, as defined by the boiler manufacturer, will be inputted by the user as well. The outdoor air temperature switch point, i.e., the temperature above which a condensing-type boiler is initially selected, may also be provided to system 120 via user interface device 190. Using data provided by interface device 190, and the outdoor air temperature provided by sensor 164 via connector 264, controller 146 will enable at least one of pumps 134-137 via their respective connectors 234-237. After a user defined delay (e.g., 1 to 10 minutes), a flow reading using flow sensor 163 in the main water line 147 will be taken. Using this flow data provided via connector 263, as well as other initializing data, controller 146 calculates an initial building heating load for system 120. Based on this calculated load and the outdoor air temperature switch point, controller 146 will determine which type of boiler (e.g., condensing or non-condensing) to initially enable. For example, if the outdoor air temperature calls for a condensing boiler and there is more than one condensing boiler available in system 120, then the first boiler selected can be based on which one has accumulated the least hours of operation. This may be done by comparing timers linked with each boiler's respective output enable circuits, unless a particular boiler in the system has been designated a dedicated lead boiler, in which case it will always be enabled or fired first. Since controller 146 also knows the output capability of each boiler on the system, controller 146 may also select for operation the boiler having an output that is most closely matched to the building load. If the condition should exist that a particular boiler is in an alarm state (i.e., the boiler is not working properly), controller 146 will not enable that boiler until the condition causing the alarm is remedied. For purposes of this example, condensing boiler 124 is initially enabled by controller 146 via connector 224. After an initial period of low fire output of boiler 124, the building heating load will be recalculated to obtain a real-time heating load. This low fire time delay, e.g., 30 minutes, is used to ensure that the initial calculated heating load is accurate so as to avoid overshooting the desired building temperature by overfiring the initially enabled or fired boiler or boilers. If the recalculated heating load indicates that heat is still required, the initially enabled boiler 124 will thereafter by operated in its normal or real-time mode, e.g., via proportional-integral-derivative (PID) control, by controller 146 via connector 224.

The operation of the PID mode of controller 146 will be constantly monitored. If controller 146 causes the output of boiler 124 to remain above a user defined output percentage (e.g., 25%-100%) for a given user defined time period (e.g., 5-60 minutes), then a second boiler, e.g., condensing boiler 123, will be enabled via connector 223 and controller 146 will split the real time heating load between the two enabled boilers 124 and 123 in a manner that operates both boilers as efficiently as possible. The heating load distribution between boilers 124 and 123 is monitored often (e.g., once per second) to ensure boilers 124 and 123 continue to be operated as efficiently as possible. If the heating load increases, this pattern of sequencing will continue until all boilers of a particular type (e.g., condensing or non-condensing) that exist in a given heating system have been enabled or fired. Should the outdoor air temperature remain above the condensing/non-condensing switch point and all condensing boilers, in this case boilers 124 and 123, have been operating at a user defined maximum output for a user defined period of time and a user defined heating load percentage (e.g., 1-10%) has not been reached, a non-condensing boiler, e.g., boiler 122 will then be enabled by an enabling signal via connector 222. Once non-condensing boiler 122 has been enabled, condensing boilers 124 and 123, that are still enabled, will be reset to cover that portion of the heating load that still allows non-condensing boiler 122 to maintain its minimum recommended return water temperature. Non-condensing boiler 122 will operate under PID control to cover the balance of the heating load. Should the heating load increase, the non-condensing boilers will follow the same sequencing control described above to enable and control additional non-condensing boilers, e.g., boiler 121, and boiler pumps, e.g., pump 134. During the run cycles of both condensing and non-condensing boiler reset loops, building zone temperatures will be polled by network temperature devices, e.g., sensors 180 and 181, to determine if the output (i.e., supply temperature) of system 120 is meeting the heating load. Based on this information, boiler reset temperatures will be increased to supply more heat if needed, decreased to increase efficiency of boiler operation, or left the same. This polling enables controller 146 to know how much energy has been used to heat the building and, based on the calculated heating load, enable only the boiler or boilers needed to most efficiently meet the remaining heating load.

Once the heating load covered by condensing boilers 124 and 123 has been satisfied, condensing boilers 124 and 123 will be shut down by controller 146 by signals provided via connectors 224 and 223, respectively. Condensing boilers 124 and 123 will be enabled again only if the return water temperature of non-condensing boilers 121 and 122 (if enabled) falls below a user defined limit (e.g., 130° F.) and remains there for more than a user defined period of time (e.g., 5-30 minutes), or if the outdoor air temperature rises above the condensing/non-condensing switch point, or if all the non-condensing boilers, in this case boilers 121 and 122, are operating at a user defined maximum output for a user defined period of time (e.g., 15-60 minutes) and have failed to adequately satisfy the heating load. As the heating load is satisfied or reduced, a non-condensing boiler will be shut down by controller 146. The boiler selected for shut down is chosen based on hours of operation. As the heating load continues to decrease, additional boilers will be shut down.

Boiler operating regulations require that a boiler must be shut down at least once every 24 hours. In order to comply with this requirement and to even wear across boilers, system 120 operates such that each boiler 121-124 is shut down at least once every six hours. This process allows controller 146 to regularly compare hours of accumulated operation and enable or fire the boiler of a given type with the least operating hours first. If the heating load of the building is determined to be less than the minimum operating range of all the available boilers 121-124 on system 120, controller 146 will select and enable the boiler having the lowest operating range. This functionality of controller 146 will help to eliminate as much as possible the efficiency losses and significant wear effects of short cycling on boilers 121-124.

When the switch to non-condensing boilers occurs because outdoor air temperature has dropped below the switch point, all of the heating load will be assigned to non-condensing boilers 121 and 122. Once a non-condensing boiler has been enabled or fired as described above and the return water temperature is equal to or greater than a user defined limit (e.g., 130° F.), any condensing boilers (e.g., boiler 123 or 124) that are enabled will be shut down, although its main pump will continue to operate for a period of time that is calculated as a percentage of the boiler's just-concluded run time in order to extract additional heat from that boiler and reduce the effects of boiler precipitation on scaling of the boiler tubes. The total load will then be assigned to the running non-condensing boiler and the reset of the supply or output temperature will be defined by an equation having a slope which is designated for non-condensing boilers.

The inlet and outlet temperature difference, i.e., $\Delta T$, is a user defined value (e.g., 10° F.-45° F. or within the boiler manufacturer's limits) that can be selected via user interface device 190. This $\Delta T$, measured by temperature sensors 144 and 145 for boiler 124, for example, is maintained to the extent possible via operation of controller 146 by providing control signals to the variable frequency drives of the boiler's respective pump, e.g., pump 137 in the above example. Pump 137, for example, will then be modulated or operated to increase or decrease water flow so as to maintain the measured $\Delta T$ with the user selected value. By modulating or controlling the flow rate of the boiler pumps, the pumps can put out less water at higher temperatures, thereby increasing boiler efficiency.

It can be seen from the previous explanation with reference to the drawings that system 120 provides microprocessor control of differing types of boilers in a heating system through the use of a variety of sensor inputs to optimally sequence and operate each boiler in the heating system to maximize efficiency of the boilers. The system is suitable for controlling multiple boilers of different sizes and of different types within the same heating system. By calculating real time heating load and using that information to select and operate boilers, efficiency losses and detrimental effects on equipment life due to short-cycling of boilers are prevented or eliminated. The system disclosed herein effectively prevents non-condensing boilers from condensing while condensing boilers are allowed to condense. The system offers the ability to reset and control both condensing and non-condensing boilers on the same system. With two unique and user definable reset temperature slopes, both types of boilers can be utilized seamlessly.

While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the disclosure provided herein are desired to be protected. The articles "a", "an", "said" and "the" are not limited to a singular element, and may include one or more such elements.

What is claimed is:

1. A hydronic heating system, comprising:
a condensing boiler having condensing operating characteristics;
a non-condensing boiler having non-condensing operating characteristics;
a sensor measuring an outdoor air temperature associated with the hydronic heating system and providing an output indicative of the measured outdoor air temperature; and
a controller, which includes a processor, operably coupled to the condensing boiler and the non-condensing boiler, the controller configured for calculating a heating load and for independently operating the condensing boiler and the non-condensing boiler in a manner that matches the heating load to at least one of the condensing operating characteristics and the non-condensing operating characteristics, wherein the controller, responsive to the sensor output being greater than a temperature switch point, initially enables the condensing boiler prior to an enabling of the non-condensing boiler by the controller, and wherein the controller, responsive to the sensor output being less than the temperature switch point, initially enables the non-condensing boiler prior to an enabling of the condensing boiler by the controller.

2. The hydronic heating system of claim 1, wherein the condensing operating characteristics includes a condensing temperature reset slope.

3. The hydronic heating system of claim 2, wherein the controller increases or decreases a boiler reset temperature of the condensing boiler in response to the condensing boiler being enabled by the controller and in response to a failure of a supply temperature of the hydronic heating system to match the heating load.

4. The hydronic heating system of claim 1, wherein the non-condensing operating characteristics includes a non-condensing temperature reset slope.

5. The hydronic heating system of claim 4, wherein the controller increases or decreases a boiler reset temperature of the non-condensing boiler in response to the non- condensing boiler being enabled by the controller and in response to a failure of a supply temperature of the hydronic heating system to match the heating load.

6. The hydronic heating system of claim 1, wherein the controller calculates the heating load as a function of the outdoor air temperature associated with the hydronic heating system.

7. The hydronic heating system of claim 1, wherein the controller calculates the heating load as a function of an indoor air temperature associated with the hydronic heating system.

8. The hydronic heating system of claim 1, wherein the controller calculates the heating load as a function of a temperature of water circulating through the hydronic heating system.

9. The hydronic heating system of claim 1, wherein the controller operates at least one of the condensing boiler and the non-condensing boiler to maintain a predetermined difference between a temperature of water entering the least one boiler and the temperature of water exiting the at least one boiler.

10. A control system for operating a hydronic heating system including a condensing boiler having condensing operating characteristics and a non-condensing boiler having non-condensing operating characteristics, the control system comprising:

a sensor measuring an outdoor air temperature associated with the hydronic heating system and providing an output indicative of the measured outdoor air temperature; and a controller, which includes a processor, operably coupled to the condensing boiler and the non-condensing boiler, the controller configured for calculating a heating load and for independently operating the condensing boiler and the non-condensing boiler in a manner that matches the heating load to at least one of the condensing operating characteristics and the non-condensing operating characteristics, wherein the controller, responsive to the sensor output being greater than a temperature switch point, initially enables the condensing boiler prior to an enabling of the non-condensing boiler by the controller, and wherein the controller, responsive to the sensor output being less than the temperature switch point, initially enables the non-condensing boiler prior to an enabling of the condensing boiler by the controller.

11. The control system of claim 10, wherein the condensing operating characteristics includes a condensing temperature reset slope.

12. The control system of claim 11, wherein the controller increases or decreases a boiler reset temperature of the condensing boiler in response to the condensing boiler being enabled by the controller and in response to a failure of a supply temperature of the hydronic heating system to match the heating load.

13. The control system of claim 10, wherein the non-condensing operating characteristics includes a non-condensing temperature reset slope.

14. The control system of claim 13, wherein the controller increases or decreases a boiler reset temperature of the non-condensing boiler in response to the non-condensing boiler being enabled by the controller and a failure of a supply temperature of the hydronic heating system to match the heating load.

15. The control system of claim 10, wherein the controller calculates the heating load as a function of the outdoor air temperature associated with the hydronic heating system.

16. The control system of claim 10, wherein the controller calculates the heating load as a function of an indoor air temperature associated with the hydronic heating system.

17. The control system of claim 10, wherein the controller calculates the heating load as a function of a temperature of water circulating through the hydronic heating system.

18. The control system of claim 10, wherein the controller operates at least one of the condensing boiler and the non-condensing boiler to maintain a predetermined difference between a temperature of water entering the least one boiler and the temperature of water exiting the at least one boiler.

* * * * *

UNITED STATES PATENT AND TRADEMARK OFFICE
CERTIFICATE OF CORRECTION

PATENT NO.      : 7,658,335 B2                                                Page 1 of 1
APPLICATION NO. : 11/627739
DATED           : February 9, 2010
INVENTOR(S)     : David E. Johnson, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this

Twenty-eighth Day of December, 2010

David J. Kappos
*Director of the United States Patent and Trademark Office*